Figure 1:
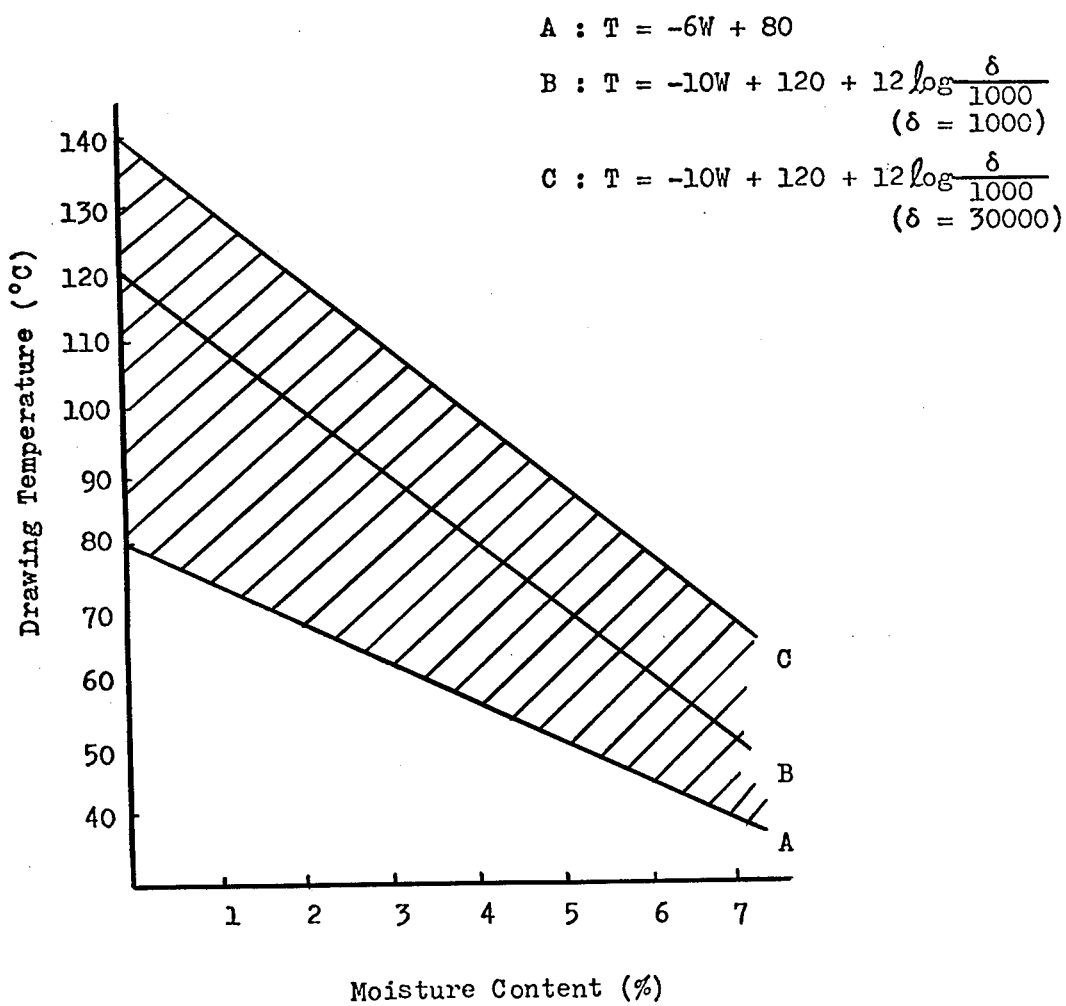

United States Patent [19]

Hachiboshi et al.

[11] 4,133,802
[45] Jan. 9, 1979

[54] META-XYLYLENE DIAMINE/ALIPHATIC DICARBOXYLIC ACID POLYAMIDE FILM

[75] Inventors: Makoto Hachiboshi; Koichi Matsunami; Hikoichi Nagano, all of Otsu; Hiroshi Ieki; Tsutomu Oko, both of Inuyama, all of Japan

[73] Assignee: Toyo Boseki Kabushiki Kaisha, Osaka, Japan

[21] Appl. No.: 760,848

[22] Filed: Jan. 21, 1977

Related U.S. Application Data

[63] Continuation of Ser. No. 454,931, Mar. 26, 1974, abandoned, which is a continuation-in-part of Ser. No. 205,172, Dec. 6, 1971, abandoned.

[51] Int. Cl.$^2$ ............................................. C08G 69/46
[52] U.S. Cl. ............................ 528/502; 260/857 TW; 260/857 PE; 260/857 UN; 528/503; 264/289; 528/310; 528/324; 528/331; 528/347
[58] Field of Search .......................... 260/78 S, 78 R; 264/289

[56] References Cited

U.S. PATENT DOCUMENTS

| | | | |
|---|---|---|---|
| 2,878,235 | 3/1959 | Butler et al. | 260/78 R |
| 3,200,183 | 8/1965 | Markey et al. | 260/78 S |
| 3,510,552 | 5/1970 | Tsuruta et al. | 260/78 S |
| 3,536,804 | 10/1970 | Fujimoto et al. | 260/78 S |
| 3,560,606 | 2/1971 | Kuga et al. | 260/78 S |
| 3,632,728 | 1/1972 | Kuga et al. | 260/78 S |
| 3,651,200 | 3/1972 | Kuga et al. | 260/78 S |
| 3,652,759 | 3/1972 | Schlemmer et al. | 260/78 S |
| 3,843,479 | 10/1974 | Matsunami et al. | 260/78 S |

*Primary Examiner*—Harold D. Anderson
*Attorney, Agent, or Firm*—Birch, Stewart, Kolasch and Birch

[57] ABSTRACT

A drawn film of polyamide having an oxygen permeability coefficient of not more than $5 \times 10^{-13}$ ml.cm/cm$^2$.sec.cmHg, a breaking strength of not less than 14 kg/mm$^2$, a breaking elongation of 30 to 150%, a yield strength of not less than 7 kg/mm$^2$ and a yield elongation of 2 to 6%, which can be manufactured by drawing an undrawn polyamide film biaxially at a temperature within a certain range and optionally heat treating the resulting drawn film, the said undrawn polyamide film being made of a polyamide having a relative viscosity of about 2.0 to 4.0 when measured with a solution thereof in 96% sulfuric acid at a concentration of 1 g/100 ml at 25° C and containing in the molecule not less than 70% (mol) of the repeating unit constituted with metaxylylenediamine or its mixture with paraxylylenediamine and an α,ω-aliphatic dicarboxylic acid having 6 to 10 carbon atoms, which is useful as a packaging material due to its excellent properties in tensile strength, yield strength, Young's modulus, heat stability, size stability, transparency, gas barrier property, etc.

12 Claims, 2 Drawing Figures

META-XYLYLENE DIAMINE/ALIPHATIC DICARBOXYLIC ACID POLYAMIDE FILM

This application is a continuation, of copending application Ser. No. 454,931, filed on Mar. 26, 1974, which is, in turn, a continuation-in-part of application Ser. No. 205,172, filed on Dec. 6, 1971, both now abandoned.

The present invention relates to the manufacture of a polyamide film. More particularly, it relates to a drawn film of polyamide containing a metaxylylene group which has excellent mechanical and physical properties, particularly a high gas barrier property, and its production.

As is well known, drawing an unoriented thermoplastic film in two directions which are perpendicular to each other affords a film of highly practical value being improved in various mechanical and physical properties.

As the result of an extensive study, it has now been found that the biaxial drawing of a certain undrawn polyamide film at a certain temperature can afford a drawn polyamide film excellent in mechanical and physical properties including tensile strength, yield strength, Young's modulus, heat stability, size stability, transparency and gas barrier property. Since the gas barrier property and the elasticity are remarkably excellent, it is highly valuable as a packaging material. The present invention is based on the above finding.

The drawn film of polyamide of the invention can be manufactured by subjecting an undrawn film of polyamide to simultaneous or stepwise biaxial drawing at a temperature within a range as calculated according to the following inequality in case of the simultaneous drawing:

$$-10W + 120 + 12\log(\delta/1000) > T \geq -6W + 80 \quad (1)$$

or according to the following inequality in case of the stepwise drawing:

$$-10W + 130 + 7\log(\delta/1000) > \geq -6W + 80 \quad (2)$$

wherein W is the moisture content (% by weight) of the undrawn film, $\delta$ is the drawing speed (%/min.) and T is the drawing temperature (° C.), said polyamide containing in the molecule not less than 70% (mol) of the repeating unit constituted with metaxylylenediamine or its mixture with paraxylylenediamine (of which the content is not more than 30% (mol) on the basis of the total amount of metaxylylenediamine and paraxylylenediamine) and an $\alpha,\omega$-aliphatic dicarboxylic acid having 6 to 10 carbon atoms.

In the polyamide, the amount of paraxylylenediamine is to be not more than 30% (mol), preferably not more than 15% (mol), on the basis of the total amount of metaxylylene-diamine and paraxylylenediamine, if used. Further, the repeating unit constituted with the xylylenediamine and the $\alpha,\omega$-aliphatic dicarboxylic acid should be included in an amount not less than 70% (mol) in the molecule chain.

The polyamide may have a relative viscosity of about 2.0 to 4.0, particularly of about 2.2 to 3.0, when determined by the method as hereinafter described.

Examples of the polyamide include homopolymers such as polymetaxylylene adipamide, polymetaxylylene sebacamide and polymetaxylylene suberamide, and copolymers such as metaxylylene/paraxylylene adipamide copolymer, metaxylylene/paraxylylene pimelamide, metaxylylene/paraxylylene sebacamide and metaxylylene/paraxylylene azelamide.

The copolymers prepared from such polyamide-forming monomer components as in the above exemplified homopolymers and copolymers and aliphatic amines (e.g. hexamethylenediamine), alicyclic diamines (e.g. piperazine), aromatic diamines (e.g. p-bis-(2-aminoethyl)-benzene), aromatic dicarboxylic acids (e.g. terephthalic acid), lactams (e.g. $\epsilon$-caprolactam), $\omega$-aminocarboxylic acids (e.g. 7-aminoheptanoic acid), aromatic aminocarboxylic acids (e.g. p-aminomethylbenzoic acid) and the like are also utilizable.

In addition to the said polyamide itself, the undrawn film may contain any other polymer (e.g. polycapramide, polyhexamethylene adipamide, polyhexamethylene sebacamide, polyundecanamide, polyethylene terephthalate, polyethylene, polypropylene), an antistatic agent, a lubricant, an antiblocking agent, a stabilizer, a dyestuff, a pigment and the like.

The undrawn film is a substantially unoriented film manufactured by a per se conventional process such as the melt process (e.g. T-die method, inflation method), wet process or dry process. When, for instance, the undrawn film is manufactured by the T-die method according to the melt process, the polyamide incorporated with or without any additive is heated at a temperature higher than the melting point, the melted polyamide is extruded through a T-die and the resulting film is cooled by a roll or a liquid bath maintained at about 30 to 70° C. to a temperature lower than the secondary transition point. In the case of the temperature of the roll or the liquid bath being higher than the secondary transition point, the resulting film tends not to be flat and tends to have lines so that even drawing in the subsequent step is effected only with difficulty.

The said "secondary transition point" can be determined by the use of a dilatometer based on the temperature dependency of the specific volume.

The thus obtained undrawn film is then biaxially drawn simultaneously or stepwise at a certain range of temperature.

When the biaxial drawing is effected simultaneously, the drawing temperature should be kept in the range according to the inequality (1). When the biaxial drawing is carried out stepwise, the drawing temperature should be maintained in the range according to the inequality (2).

The moisture content (W) can be measured by a per se conventional procedure such as the weighing method or the Karl-Fischer method.

The drawing speed ($\delta$) is defined as the drawing rate per unit time in the drawing operation and can be calculated by the following equation:

$$\text{Drawing speed (\%/min.)} = \frac{\text{Length after drawing}}{\text{Length before drawing}} \times 100 \div \text{Drawing time (min.)}$$

In the practical operation, the drawing speed in case of simultaneous drawing is usually from about 500 to 50,000 %/min., preferably from about 1,000 to 30,000 %/min. The drawing speed in case of stepwise drawing is usually from about 500 to 500,000 %/min. in the longitudinal direction and from about 500 to 50,000 %/min. in the latitudinal direction, preferably from about 1,000 to 100,000 %/min. in the longitudinal direction and from about 1,000 to 30,000 %/min. in the latitudinal direction.

The draw ratio is usually from about 2 to 6, preferably from about 2.5 to 4.5, in one direction. The draw ratio in the longitudinal direction may be the same as or different from that in the latitudinal direction.

The drawing speed in case of simultaneous or stepwise drawing is varied widely with various factors such as the thickness and the physical properties of the undrawn film, the drawing apparatus and economic considerations. When the draw ratios in the longitudinal and latitudinal directions are the same, the drawing speeds in these directions are also the same. When the draw ratios are different, then the drawing speeds may be made different depending thereon. In this case, the ratio of the drawing speed in the longitudinal direction to that in the latitudinal direction is usually from 0.5 to 2. A smaller or larger ratio is generally not favored, because the unevenness of the drawing is produced or the breaking of the film occurs.

The moisture content in the undrawn film is changed broadly depending on the environment under which it is produced and can be appropriately controlled. Usually, the moisture content is between about 0.1 and about 5% by weight. A preferred range is from about 0.3 to 3% by weight.

When the simultaneous or stepwise drawing is performed at a temperature as calculated by the inequality as (1) or (2) with the drawing speed and the moisture content, an evenly drawn film is obtained. If the drawing is effected at a lower temperature, there will be required a much higher tension for drawing which may cause breaking at an early stage of drawing. If the drawing is carried out at a higher temperature, then necking is produced at a high draw ratio of around 2.7 to 3.0 so that the thickness of the drawn film is made uneven and the breaking will be met at a later stage of drawing.

Figure 2:
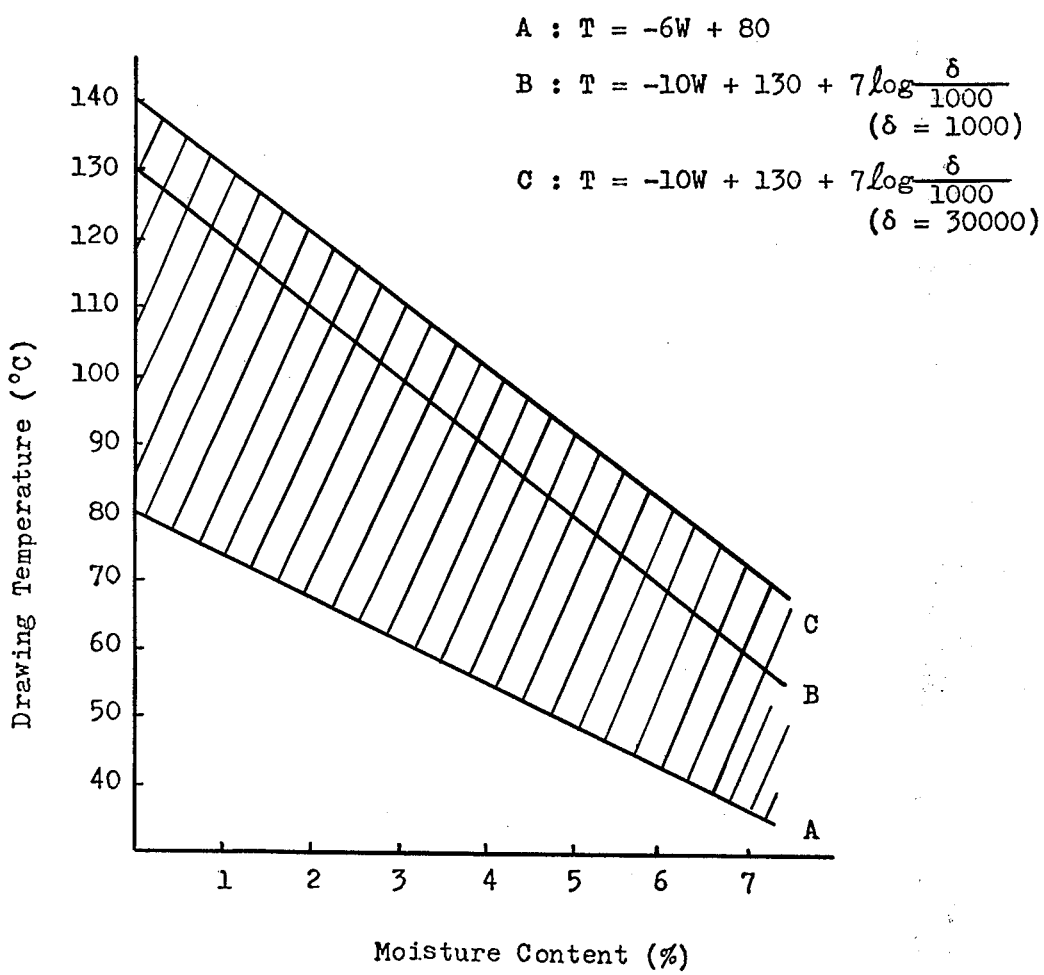

Illustrating the range of the drawing temperature as calculated according to the inequalities (1) and (2) by the aid of FIGS. 1 and 2 of the accompanying drawings, which correspond respectively to simultaneous drawing and stepwise drawing, the line A is the lower limit of the drawing temperature, the line B is the upper limit of the drawing temperature in case of the drawing speed ($\delta$) being 1000 %/min. and the line C is the upper limit of the drawing temperature in case of the drawing speed ($\delta$) being 30000 %/min. An appropriate range of the drawing temperature is thus the hatched area between the line A and the line B or the hatched area between the line A and the line C depending on the drawing speed.

The simultaneous biaxial drawing may be effected by a conventional procedure such as the tenter method or the inflation method.

In case of the stepwise drawing, the drawing may be ordinarily carried out between two or more sets of rolls which are arranged in the advancing direction and have different rotation speeds with respect to each other. When the uniaxial drawing of a film of an aliphatic polyamide such as polycapramide or polyhexamethyleneadipamide is uniaxially drawn according to a conventional procedure, necking is usually produced and even drawing becomes difficult unless the film is drawn with a high draw ratio. According to the present invention, the uniform drawing can be attained quite easily. For drawing the film transversely, both edges of the film are kept by tenter clips, and drawing is effected in a tenter as it is heated. The order of the drawing in the longitudinal and latitudinal directions may be optional. In other words, the drawing may be effected first in the longitudinal direction and then in the latitudinal direction or vice versa.

The drawn film thus obtained by simultaneous or stepwise biaxial drawing shows, as such, various favorable properties. If necessary, it may be further subjected to heat treatment at a temperature between the temperature which is about 5° C. above the drawing temperature during manufacture of the drawn film and the melting temperature of the drawn film for a period of not more than about 5 minutes, preferably for about 15 to about 60 seconds. During the heat treatment, the film may be kept under a tensioned or relaxed state. As the result of the heat treatment, the degree of crystallinity of the film increases and the strain of the film produced in the drawing process is eliminated so that the mechanical property and the size stability of the film are considerably improved.

The thus prepared film has excellent crystallinity and well balanced orientation characteristics. For instance, a plane orientation index of 0.025 or more and a degree of balance of 0.045 or less can be realized. Further, the film is highly transparent and the haze value is normally 3.0 or less.

In this connection, it should be noted that the polyamide, of which the drawn film of the invention is made, contains an aromatic ring in the main chain and the molecular chain is considerably stiff so that, different from usual polyamides, the glass transition temperature is relatively high and the crystallization rate is comparatively small. In fact, the behavior on drawing, such as the stress in elongation and its dependency on temperature, of the undrawn polyamide film used in this invention is much different from that of an undrawn polycapramide film and is rather similar to that of an undrawn polyethylene terephthalate film. Accordingly, the application of any conventional procedure heretofore adopted with the drawing of the usual undrawn polyamide films can not assure the successful production of the drawn polyamide film of the invention. In other words, the adoption of the particular drawing procedure as hereinabove described is necessary for the assured production of the drawn polyamide film of the invention.

The drawn film thus manufactured has generally the following physical constants when determined by the procedures as hereinafter illustrated:

(a) Oxygen permeability coefficient: not more than 5 $\times 10^{-13}$ ml.cm/cm$^2$.sec.cmHg;

(b) Breaking strength: not less than 14 kg/mm$^2$;

(c) Breaking elongation: 30 to 150% (particularly 50 to 100%);

(d) Yield strength: not less than 7 kg/mm$^2$ (particularly not less than 10 kg/mm$^2$);

(e) Yield elongation: 2 to 6% (particularly 3 to 5%).

Usually, it has also a plane orientation index of not less than 0.025 and a degree of balance of not more than 0.045.

From such physical constants, it may be understood that the drawn film of the invention is more excellent in tensile strength, yield strength, Young's modulus, heat stability, size stability, transparency and gas barrier property than known biaxially drawn films of aliphatic linear polyamides such as polycapramide and polyhexamethylene adipamide. It is particularly notable that the drawn film of the invention has a much superior gas barrier property than conventional polyester (e.g. polyethylene terephthalate) films with advantageous mechanical properties nearly equal to or more excellent than the latter.

Due to the said advantageous properties, particularly the excellent gas barrier property and high elasticity, it can be used as a packaging material for foods, fibers and machines, a tape, a photographic film base or the like.

Practical and presently preferred embodiments of the present invention are illustratively shown in the following Examples wherein the various measurements are carried out as follows:

(1) Relative viscosity:

Measured on a solution in 96% sulfuric acid at a concentration of 1 g/100 ml at 25° C.

(2) Breaking strength; breaking elongation:

Measured according to ASTM-D 882.

(3) Yield strength; yield elongation:

Measured according to ASTM-D 882.

(4) Haze value:

Determined by the use of a haze tester (manufactured by Toyo Seiki K.K.) and calculated according to the following equation:

$$\text{Haze value} = [(A - B)/A] \times 100$$

wherein A is the total quantity of transmitted light and A−B is the quantity of diffused light.

(5) Shrinkage:

A test piece 65 mm long and 10 mm wide, marked at the points of 50 mm distance, is allowed to stand in a dryer at 130° C. for 1 hour. The change ($\Delta L$) in the distance between the marked points is measured, and the shrinkage is calculated according to the following equation:

$$\text{Shrinkage} = (\Delta L/50) \times 100$$

(6) Oxygen permeability coefficient:

Measured by the use of a gas permeability measuring apparatus (manufactured by Rika Seiki Kogyosha) at 30° C. according to ASTM-D 1434-58.

(7) Plane orientation index; degree of balance:

Refractive indexes of a test piece of longitude (x), latitude (y) and thickness (z) are measured by the use of a refractometer, and the plane orientation index and the degree of balance are calculated according to the following equations:

$$\text{Plane orientation index} = [(x + y)/z] - z$$

$$\text{Degree of balance} = |x - y|$$

EXAMPLE 1

A metaxylylene/paraxylylene adipamide copolymer (molar ratio of metaxylylene/paraxylylene = 99/1; relative viscosity, 2.21) is melted at 260° C. and extruded through a flat die onto a cooling roll to give undrawn films of 200μ in thickness. The undrawn films are allowed to stand under a variety of humidities. The resulting undrawn films having a variety of moisture contents are subjected to biaxial drawing simultaneously and equally in the longitudinal and latitudinal directions with various drawing speeds and drawing temperatures according to the tenter method.

The results are shown in Table 1 wherein: the mark "φ" indicates satisfactory drawing and the marks "BE" and "BL" denote respectively breaking at an early stage and a later stage of the drawing operation; and the marks "IT" and "CT" represent respectively the drawing temperature within and outside the range as defined in the invention.

Table 1

| Test piece No. | Moisture content (%) | Draw ratio | Drawing speed (%/min.) | Temperature (° C) | Observation | Temperature range |
|---|---|---|---|---|---|---|
| 1 | 0.20 | 4.0 | 30,000 | 85 | φ | IT |
| 2 | 0.20 | 3.5 | 30,000 | 77 | BE | CT |
| 3 | 0.20 | 2.0 | 1,000 | 77 | BL | CT |
| 4 | 0.40 | 4.0 | 30,000 | 98 | φ | IT |
| 5 | 0.40 | 4.0 | 30,000 | 90 | φ | IT |
| 6 | 0.40 | 4.0 | 5,000 | 90 | φ | IT |
| 7 | 0.40 | 3.5 | 1,000 | 90 | φ | IT |
| 8 | 1.84 | 3.5 | 10,000 | 90 | φ | IT |
| 9 | 1.84 | 4.0 | 30,000 | 70 | φ | IT |
| 10 | 1.84 | 3.0 | 5,000 | 70 | φ | IT |
| 11 | 1.84 | 3.0 | 5,000 | 66 | BE | CT |
| 12 | 2.96 | 3.5 | 30,000 | 55 | BE | CT |
| 13 | 2.96 | 3.0 | 5,000 | 55 | BE | CT |
| 14 | 4.28 | 4.0 | 30,000 | 60 | φ | IT |
| 15 | 4.28 | 3.5 | 1,000 | 60 | φ | IT |
| 16 | 4.28 | 2.0 | 5,000 | 40 | BL | CT |
| 17 | 6.60 | 3.5 | 30,000 | 45 | φ | IT |
| 18 | 6.60 | 2.0 | 30,000 | 35 | BL | CT |
| 19 | 6.60 | 3.5 | 30,000 | 35 | BE | CT |
| 20 | 0.20 | 3.5 | 1,000 | 120 | BL | CT |
| 21 | 0.20 | 3.0 | 1,000 | 125 | BL | CT |
| 22 | 0.20 | 4.0 | 30,000 | 120 | φ | IT |
| 23 | 0.20 | 4.0 | 5,000 | 120 | φ | IT |
| 24 | 0.20 | 4.0 | 10,000 | 110 | φ | IT |
| 25 | 1.84 | 3.5 | 1,000 | 100 | φ | IT |
| 26 | 2.96 | 3.5 | 1,000 | 93 | BL | CT |
| 27 | 4.28 | 3.5 | 1,000 | 74 | φ | IT |
| 28 | 6.60 | 3.5 | 1,000 | 55 | BL | CT |
| 29 | 6.60 | 3.0 | 10,000 | 55 | φ | IT |
| 30 | 6.60 | 3.5 | 1,000 | 50 | φ | IT |
| 31 | 0.20 | 3.5 | 5,000 | 130 | BL | CT |
| 32 | 1.84 | 3.5 | 5,000 | 110 | BL | CT |
| 33 | 2.96 | 3.5 | 5,000 | 95 | φ | IT |
| 34 | 4.28 | 3.5 | 5,000 | 90 | BL | CT |
| 35 | 6.60 | 3.5 | 5,000 | 60 | φ | IT |
| 36 | 6.60 | 3.5 | 5,000 | 65 | BL | CT |
| 37 | 6.60 | 4.0 | 30,000 | 65 | φ | IT |
| 38 | 0.20 | 3.5 | 10,000 | 135 | BL | CT |
| 39 | 0.20 | 3.5 | 10,000 | 128 | φ | IT |
| 40 | 1.84 | 3.5 | 10,000 | 110 | φ | IT |
| 41 | 2.96 | 3.5 | 10,000 | 105 | BL | CT |
| 42 | 4.28 | 3.5 | 10,000 | 85 | φ | IT |
| 43 | 6.60 | 3.5 | 10,000 | 75 | BL | CT |
| 44 | 6.60 | 3.5 | 10,000 | 65 | φ | IT |
| 45 | 0.20 | 4.0 | 30,000 | 140 | BL | CT |
| 46 | 0.20 | 3.0 | 10,000 | 140 | BL | CT |
| 47 | 0.20 | 3.75 | 30,000 | 135 | φ | IT |
| 48 | 1.84 | 3.5 | 30,000 | 125 | BL | CT |
| 49 | 2.96 | 3.5 | 30,000 | 105 | φ | IT |
| 50 | 4.28 | 3.5 | 30,000 | 120 | BL | CT |
| 51 | 4.28 | 3.5 | 30,000 | 100 | BL | CT |
| 52 | 4.28 | 3.5 | 30,000 | 90 | φ | IT |
| 53 | 6.60 | 3.5 | 30,000 | 110 | BL | CT |
| 54 | 6.60 | 3.0 | 30,000 | 80 | BL | CT |
| 55 | 6.60 | 3.5 | 30,000 | 65 | φ | IT |

EXAMPLE 2

The biaxially drawn films (Test pieces Nos. 4, 7, 8 and 55), as obtained in Example 1, are heat set at 200° C. for 30 seconds.

The physical properties of the resulting films are shown in Table 2.

Table 2

| Test piece | 4 | | 7 | | 8 | | 55 | |
|---|---|---|---|---|---|---|---|---|
| | Longitudinal | Latitudinal | Longitudinal | Latitudinal | Longitudinal | Latitudinal | Longitudinal | Latitudinal |
| Breaking strength (kg/mm$^2$) | 23.4 | 29.8 | 18.0 | 20.1 | 18.4 | 19.7 | 14.1 | 14.4 |

Table 2-continued

| Test piece | 4 Longi-tudinal | 4 Lati-tudinal | 7 Longi-tudinal | 7 Lati-tudinal | 8 Longi-tudinal | 8 Lati-tudinal | 55 Longi-tudinal | 55 Lati-tudinal |
|---|---|---|---|---|---|---|---|---|
| Breaking (%) | 59 | 54 | 102 | 100 | 104 | 117 | 108 | 110 |
| Yield strength (kg/mm$^2$) | 13.5 | 13.8 | 13.5 | 13.7 | 11.3 | 11.8 | 11.6 | 11.1 |
| Yield elongation (%) | 3.5 | 3.1 | 3.6 | 3.2 | 4.0 | 4.2 | 3.7 | 3.5 |
| Shrinkage (%) | 1.9 | 2.1 | 1.3 | 1.4 | 1.1 | 1.1 | 0.9 | 1.0 |
| Oxygen permeability coefficient | $2.9 \times 10^{-13}$ | | $4.5 \times 10^{-13}$ | | $4.6 \times 10^{-13}$ | | $3.4 \times 10^{-13}$ | |
| Plane orientation index | 0.040 | | 0.036 | | 0.036 | | 0.026 | |
| Degree of balance | 0.011 | | 0.007 | | 0.011 | | 0.003 | |
| Haze value (%) | 1.8 | | 1.2 | | 1.3 | | 2.0 | |

EXAMPLE 3

The undrawn films after being allowed to stand under a variety of humidities, as obtained in Example 1, are subjected to biaxial drawing simultaneously in the longitudinal and latitudinal directions but with different draw ratios.

The results are shown in Table 3.

EXAMPLE 4

The undrawn films after being allowed to stand under a variety of humidities, as obtained in Example 1, are subjected to biaxial drawing stepwise first the longitudinal and subsequently in the latitudinal directions or, exceptionally in case of Test pieces Nos. 64 and 78, first in the latitudinal and subsequently in the longitudinal directions with various drawing speeds and drawing temperatures.

The results are shown in Table 4.

Table 4

| Test piece No. | Moisture content (%) | 1st Drawing Draw ratio | 1st Drawing Drawing speed (%/min.) | 1st Drawing Temperature (°C) | Observation | 2nd Drawing Draw ratio | 2nd Drawing Drawing speed (%/min.) | 2nd Drawing Temperature (°C) | Observation | Temperature range |
|---|---|---|---|---|---|---|---|---|---|---|
| 61 | 0.20 | 4.0 | 30,000 | 85 | φ | 3.0 | 5,000 | 90 | φ | IT |
| 62 | 0.20 | 3.5 | 30,000 | 75 | BE | — | — | — | — | CT |
| 63 | 0.20 | 2.0 | 5,000 | 75 | BE | — | — | — | — | CT |
| 64 | 0.20 | 3.5 | 5,000 | 90 | φ | 4.0 | 30,000 | 105 | φ | IT |
| 65 | 0.20 | 4.0 | 10,000 | 115 | φ | 3.5 | 1,000 | 120 | φ | IT |
| 66 | 0.20 | 4.0 | 10,000 | 115 | φ | 3.5 | 1,000 | 130 | BL | CT |
| 67 | 0.20 | 4.0 | 1,000 | 130 | BL | — | — | — | — | CT |
| 68 | 0.20 | 4.0 | 5,000 | 130 | φ | 3.0 | 30,000 | 135 | φ | IT |
| 69 | 0.20 | 4.0 | 10,000 | 130 | φ | 3.0 | 30,000 | 140 | BL | CT |
| 70 | 0.40 | 3.5 | 30,000 | 95 | φ | 3.5 | 5,000 | 100 | φ | II |
| 71 | 0.80 | 3.75 | 30,000 | 85 | φ | 3.5 | 2,000 | 100 | φ | IT |
| 72 | 1.84 | 3.5 | 30,000 | 70 | φ | 4.0 | 5,000 | 80 | φ | IT |
| 73 | 1.84 | 4.0 | 10,000 | 100 | φ | 3.0 | 1,000 | 110 | φ | IT |
| 74 | 1.84 | 4.0 | 10,000 | 100 | φ | 3.0 | 1,000 | 118 | BL | CT |
| 75 | 1.84 | 4.0 | 10,000 | 100 | φ | 3.0 | 5,000 | 118 | BL | CT |
| 76 | 1.84 | 4.0 | 10,000 | 100 | φ | 3.0 | 10,000 | 118 | φ | IT |
| 77 | 2.96 | 2.5 | 1,000 | 65 | φ | 2.0 | 5,000 | 60 | BE | CT |
| 78 | 2.96 | 3.5 | 5,000 | 80 | φ | 4.0 | 30,000 | 90 | φ | IT |
| 79 | 2.96 | 3.5 | 1,000 | 103 | BL | — | — | — | — | CT |
| 80 | 2.96 | 3.5 | 5,000 | 103 | φ | 3.5 | 30,000 | 109 | φ | IT |
| 81 | 2.96 | 3.5 | 5,000 | 103 | φ | 3.5 | 30,000 | 115 | BL | CT |
| 82 | 2.96 | 4.0 | 30,000 | 109 | φ | 3.0 | 1,000 | 115 | BL | CT |
| 83 | 2.96 | 4.0 | 30,000 | 109 | φ | 3.5 | 30,000 | 115 | BL | CT |
| 84 | 4.28 | 2.0 | 30,000 | 50 | BE | — | — | — | — | CT |
| 85 | 4.28 | 3.0 | 30,000 | 60 | φ | 4.0 | 1,000 | 75 | φ | IT |
| 86 | 4.28 | 3.5 | 1,000 | 85 | φ | 3.0 | 1,000 | 90 | BL | CT |
| 87 | 4.28 | 3.5 | 1,000 | 85 | φ | 3.0 | 5,000 | 90 | φ | IT |
| 88 | 4.28 | 3.5 | 1,000 | 85 | φ | 3.0 | 30,000 | 95 | φ | IT |
| 89 | 4.28 | 3.5 | 1,000 | 85 | φ | 3.0 | 10,000 | 95 | BL | CT |
| 90 | 4.28 | 3.5 | 5,000 | 90 | φ | 3.5 | 30,000 | 100 | BL | CT |
| 91 | 4.28 | 3.5 | 30,000 | 100 | BL | — | — | — | — | CT |
| 92 | 6.60 | 2.0 | 1,000 | 35 | BE | — | — | — | — | CT |
| 93 | 6.60 | 4.0 | 1,000 | 45 | φ | 3.0 | 1,000 | 55 | φ | IT |
| 94 | 6.60 | 3.5 | 10,000 | 70 | φ | 2.7 | 30,000 | 73 | φ | IT |
| 95 | 6.60 | 3.5 | 10,000 | 70 | φ | 2.7 | 30,000 | 83 | BL | CT |
| 96 | 6.60 | 3.0 | 5,000 | 70 | BL | — | — | — | — | CT |
| 97 | 0.20 | 3.0 | 30,000 | 140 | BL | — | — | — | — | CT |
| 98 | 1.84 | 3.5 | 5,000 | 115 | φ | 3.5 | 30,000 | 120 | φ | IT |
| 99 | 1.84 | 2.5 | 1,000 | 115 | φ | 3.0 | 30,000 | 130 | BL | CT |
| 100 | 1.84 | 3.0 | 1,000 | 115 | BL | — | — | — | — | CT |

Table 3

| Test piece No. | Moisture content (%) | Draw ratio Longi-tudinal | Draw ratio Latitu-dinal | Drawing speed (%/min.) Long-itudinal | Drawing speed (%/min.) Latitu-dinal | Temperature (°C) | Observation |
|---|---|---|---|---|---|---|---|
| 56 | 0.40 | 4.2 | 2.8 | 7,500 | 5,000 | 90 | φ |
| 57 | 1.84 | 3.0 | 3.6 | 5,000 | 6,000 | 70 | φ |
| 58 | 0.20 | 4.0 | 3.0 | 10,000 | 7,500 | 110 | φ |
| 59 | 4.28 | 3.0 | 3.6 | 1,000 | 1,200 | 74 | φ |

EXAMPLE 5

The biaxially drawn films (Test pieces Nos. 70 and 71), as obtained in Example 4, are heat set at 200° C. for 30 seconds and at 230° C. for 20 seconds, respectively.

The physical properties of the resulting films are shown in Table 5.

Table 5

| Test piece No. | 70 | | 81 | |
|---|---|---|---|---|
| | Longi-tudinal | Lati-tudinal | Longi-tudinal | Lati-tudinal |
| Breaking strength (kg/mm$^2$) | 25.0 | 28.1 | 23.6 | 25.0 |
| Breaking elongation (%) | 102 | 50 | 67 | 38 |
| Yield strenght (kg/mm$^2$) | 13.7 | 13.6 | 11.0 | 11.7 |
| Yield elongation (%) | 2.9 | 3.4 | 3.6 | 3.1 |
| Shrinkage (%) | 0.9 | 2.1 | 1.6 | 2.0 |
| Oxygen permeability coefficient | 3.1 × 10$^{-13}$ | | 2.6 × 10$^{-13}$ | |
| Plane orientation index | 0.039 | | 0.040 | |
| Degree of balance | 0.031 | | 0.014 | |
| Haze value (%) | 1.0 | | 1.2 | |

EXAMPLE 6

A metaxylylene/paraxylylene adipamide copolymer (molar ratio of metaxylylene/paraxylylene molar = 99:1; relative viscosity, 2.21; melting point, 231° C.) is heated at 270° C. and extruded through a flat die onto a roll having a temperature of 68° C. to form an undrawn film having a thickness of 200 microns and a water content of 2.6% by weight. The undrawn film is then drawn simultaneously in the longitudinal and latitudinal directions at a temperature of 83° C., a drawing rate of 10,000% per minute for both directions and a drawing ratio of 3.6 for both directions. The film thus drawn is heat set for 30 seconds at 200° C. to form a biaxially drawn film having a thickness of 17 microns.

EXAMPLE 7

The same copolymer as in Example 6 except for having a relative viscosity of 2.12 is heated at 260° C. and extruded through a flat die onto a roll having a temperature of 69° C. to form an undrawn film 190 microns thick. The undrawn film having a water content of 0.6% by weight is then drawn first longitudinally at a temperature of 86° C., a drawing rate of 30,000% per minute and a drawing ratio of 3.75 and then latitudinally at a temperature of 118° C., a drawing rate of 5,000% per minute and a drawing ratio of 3.6 with a tentering machine. The biaxially drawn film is heat set for 20 seconds at 210° C. to form a film having a thickness of 14 microns.

REFERENCE EXAMPLE A

A polycapramide having a relative viscosity of 3.0 and a melting point of 228° C. is heated at 250° C. and extruded through a flat die onto a roll having a temperature of 42° C. to form an undrawn film 150 microns thick with a water content of 2.5% by weight, which is in turn drawn at the same time longitudinally and latitudinally at a temperature of 120° C., a drawing rate of 30,000% per minute for both directions and a drawing ratio of 3 for both directions. The biaxially drawn film thus obtained is then heat set for 8 seconds at 200° C. to form a film having a thickness of 17 microns.

The films as prepared in Examples 6 and 7 and in Reference Example A were tested as to various properties according to the methods as described above except for the following properties:

a. The density was measured according to ASTM D1505 at a temperature of 25° C.

b. The moisture permeability was measured according to JIS (Japanese Industrial Standard) Z0208.

c. The Young's modulus was measured according to ASTM D882-64T.

d. The transparency was measured according to JIS K6714.

The test results are shown in Table 6.

Table 6

| | Example 6 | | Example 7 | | Reference Example A | |
|---|---|---|---|---|---|---|
| | MD | TD | MD | TD | MD | TD |
| Density (g/ml) | 1.230 | | 1.232 | | 1.154 | |
| Haze value (%) | 3.1 | | 1.4 | | 4.3 | |
| Transparency (%) | 90 | | 92 | | 93 | |
| Yield strength (kg/mm$^2$) | 11.4 | 11.5 | 11.6 | 11.8 | 3.1 | 2.7 |
| Yield elongation (%) | 3.3 | 3.3 | 3.6 | 3.2 | 3.0 | 2.7 |
| Breaking strength (kg/mm$^2$) | 19.2 | 20.0 | 16.8 | 22.9 | 19.4 | 17.7 |
| Breaking elongation (%) | 68 | 61 | 65 | 40 | 85 | 85 |
| Young's modulus (kg/mm$^2$) | 490 | 500 | 471 | 553 | 142 | 137 |
| Oxygen permeability coefficient (ml.cm/cm$^2$. sec.cmHg) | 3.4 × 10$^{-13}$ | | 2.6 × 10$^{-13}$ | | 2.4 × 10$^{-12}$ | |
| Moisture permeability (g/m$^2$.25μ.24hrs) | 51 | | 48 | | 163 | |

Note:
MD, machine (i.e. longitudinal) direction;
TD, transverse (i.e. latitudinal) direction.

From the above results, it is understood that the polyamide films of the invention, both simultaneously and stepwise drawn, are excellent particularly with regard to their yield strength, Young's modulus, oxygen permeability coefficient and moisture permeability. Since the Young's modulus of the polyamide films of the invention is greater than that of the polycapramide film, it may be said that the rigidity and stiffness of the former is more suitable for the practical use as a packaging material than those of the latter.

It is also understood that the polyamide films of the invention have a lower oxygen permeability coefficient than the polycapramide film and, when used in the field of packaging, the former can protect the materials therein better than the latter. The following test results support thus consideration:

Into an aluminum cup (to be used for the measurement of moisture permeability according to JIS Z0208) was poured 5 ml of a commercially available soya bean oil or 10 ml of soya sauce (manufactured by Kikkoman Shoyu Kabushiki Kaisha, Japan). The cup was then placed under an atmosphere of dry and purified nitrogen to substitute nitrogen for the air in the cup and covered with each of the films as prepared in Examples 6 and 7 and in Reference Example A under said atmosphere in the same manner as used for measurement of the moisture permeability.

The cups each containing either of the samples were placed in a thermostat at 40° C. and 60% relative humidity. They were then taken at the intervals of 25 days and 50 days after the storage. The effects of the oxygen permeability of the films were determined by measuring the peroxide value for the soya bean oil and the change of absorbance for the soya sauce tested.

The determination of the peroxide value was made as follows:

To a solution of 1 g of the sample to be tested in 10 ml of chloroform and 15 ml of glacial acetic acid was added 1 ml of a potassium iodide aqueous saturated solution. The mixture was stirred for 1 minute and placed in a dark place for 15 minutes. After the addition thereto of 75 ml of distilled water, the solution was vigorously stirred for 30 minutes and then titrated with a 1/100N sodium thiosulfate solution. The peroxide value was calculated by the following equation:

Peroxide value (mg equivalent per kg) =

1/100$N$ sodium thiosulfate solution consumed (ml) $\times$ 10

The determination of the color of soya sauces was made as follows: The sample was diluted to 100 times the original volume with distilled water and measured at a wave length of 500 millimicrons with a spectrophotometer (FPU-2A manufactured by Hitachi, Ltd., Japan).

The test results are shown in Table 7.

Table 7

| Sample | Film used | Increase in peroxide values after storage | | Increase in absorbance after storage | |
|---|---|---|---|---|---|
| | | 25 days | 50 days | 25 days | 50 days |
| A | Example 6 | +0.2 | +1.6 | 0.01 | +0.02 |
| B | Example 7 | +0.2 | +1.7 | +0.01 | +0.02 |
| C | Reference Example A | +1.5 | +10.7 | +0.02 | +0.04 |

Note: Initial peroxide value, 3.0; initial value of absorbance, 0.13.

What is claimed is:

1. A biaxially drawn film of a polyamide which is produced by subjecting an undrawn film of polyamide to simultaneous or stepwise biaxial drawing at a temperature within a range as calculated according to the following inequality in the case of simultaneous drawing:

$$-10W + 120 + 12 \log (\delta/1000) > T \geq -6W + 80$$

or according to the following inequality in the case of stepwise drawing:

$$-10W + 130 + 7 \log (\delta/1000) > T \geq -6W + 80$$

wherein W is the moisture content in % by weight of the undrawn film, $\delta$ is the speed in % per minute and T is the drawing temperature in ° C., said polyamide containing not less than 70 mole % of repeating units of an $\alpha,\delta$-aliphatic dicarboxylic acid having 6 to 10 carbon atoms and metaxylylendiamine or a mixture of metaxylylenediamine and paraxylylenediamine, the amount of paraxylylenediamine present in the polyamide being not more than 30 mole % of the total amount of metaxylylenediamine and paraxylylenediamine, the balance of said polyamide being units of a polyamide-forming monomer copolymerizable with said repeating units.

2. A biaxially drawn film of a polyamide which is produced by subjecting an undrawn film of polyamide to simultaneous or stepwise biaxial drawing at a temperature within a range as calculated according to the following inequality in the case of simultaneous drawing:

$$-10W + 120 + 12 \log (\delta/1000) > T \geq -6W + 80$$

or according to the following inequality in the case of stepwise drawing:

$$-10W + 130 + 7 + \log (\delta/1000) > T \geq -6W + 80$$

wherein the moisture content W is from 0.1 to 5% by weight, the drawing speed $\delta$ is from 500 to 50,000 %/min in the case of simultaneous drawing and from 500 to 500,000 %/min in the case of stepwise drawing and T is the drawing temperature in ° C., said polyamide containing not less than 70 mole % of repeating units of an $\alpha,\omega$-aliphatic dicarboxylic acid having 6 to 10 carbon atoms and metaxylylenediamine or a mixture of metaxylylenediamine and paraxylylenediamine, the amount of paraxylylenediamine present in the polyamide being not more than 30 mole % of the total amount of metaxylylenediamine and paraxylylenediamine, the balance of said polyamide being units of a polyamide-forming monomer copolymerizable with said repeating units and being selected from the group consisting of aliphatic amines, alicyclic diamines, aromatic diamines, aromatic dicarboxylic acids, lactams, $\omega$-aminocarboxylic acids and aromatic aminocarboxylic acids, said drawn film having an oxygen permeability coefficient of from $2.6 \times 10^{-13}$ to $5 \times 10^{-13}$ ml. cm/cm.$^2$ sec. cm Hg, a breaking strength of from 14 to 29.8 kg/mm$^2$, a breaking elongation of from 30 to 150%, a yield strength of from 7 to 13.8 kg/mm$^2$, a yield elongation of from 2 to 6%, a plane orientation index of from 0.025 to 0.040, and a degree of balance of from 0.003 to 0.045.

3. The drawn film according to claim 1, wherein the undrawn film is made of a polyamide having a relative viscosity of about 2.0 to 4.0 as measured with a solution thereof in 96% sulfuric acid at a concentration of 1 g/100 ml at 25° C.

4. The drawn film according to claim 1, wherein the drawing is effected simultaneously with a drawing speed of from about 500 to 50,000 %/min.

5. The drawn film according to claim 1, wherein the drawing is effected stepwise with a drawing speed of about 500 to 500,000 %/min. in the longitudinal direction and a drawing speed of about 500 to 50,000 %/min. in the latitudinal direction.

6. The drawn film according to claim 1, wherein the drawing is effected at a draw ratio of about 2 to 6 in each of the longitudinal and latitudinal directions.

7. The drawn film according to claim 1, wherein the undrawn film has a moisture content of 0.1 to 5% by weight.

8. The drawn film according to claim 1, wherein the drawn film is further subjected to heat treatment at a temperature between about 5° C., above the drawing temperature during the production of the drawn film and the melting temperature of the drawn film.

9. The drawn film according to claim 8, wherein the heat treatment is effected for a period of not more than about 5 minutes.

10. The drawn film according to claim 1, wherein the drawn film is further subjected to heat treatment at a temperature between about 5° C. above the drawing temperature during the production of the drawn film and the melting temperature of the drawn film, whereby the degree of crystallinity of the film is increased and the strain produced on the film in the drawing process is eliminated, thereby substantially improving the mechanical properties and the size stability thereof.

11. The drawn film according to claim 2, wherein said oxygen permeability coefficient is $2.6 \times 10^{-13}$ to $4.6 \times 10^{-13}$ ml. cm/cm.$^2$ sec. cm Hg, said breaking strength is 14.1 to 29.8 kg/mm$^2$, said breaking elongation is 38 to 117%, said yield strength is 11.1 to 13.8 kg/mm$^2$, said yield elongation is 3.1 to 4.2%, said plane orientation index is 0.026 to 0.040, and said degree of balance is 0.003 to 0.014.

12. The drawn film according to claim 1, wherein said copolymerizable polyamide-forming monomer is selected from the group consisting of aliphatic amines, alicyclic diamins, aromatic diamines, aromatic dicarboxylic acids, lactams, ω-aminocarboxylic acids and aromatic aminocarboxylic acids.

* * * * *